(12) United States Patent
Khosla et al.

(10) Patent No.: US 9,740,949 B1
(45) Date of Patent: Aug. 22, 2017

(54) SYSTEM AND METHOD FOR DETECTION OF OBJECTS OF INTEREST IN IMAGERY

(71) Applicant: HRL Laboratories, LLC, Malibu, CA (US)

(72) Inventors: Deepak Khosla, Camarillo, CA (US); Matthew Keegan, Marina Del Ray, CA (US); Lei Zhang, Los Angeles, CA (US); Kevin R. Martin, Oak Park, CA (US); Darrel J. VanBuer, Los Angeles, CA (US); David J. Huber, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 444 days.

(21) Appl. No.: 14/054,584

(22) Filed: Oct. 15, 2013

Related U.S. Application Data

(63) Continuation-in-part of application No. 12/982,713, filed on Dec. 30, 2010, now Pat. No. 8,774,517.
(Continued)

(51) Int. Cl.
   *G06K 9/32* (2006.01)
(52) U.S. Cl.
   CPC .................. *G06K 9/3233* (2013.01)
(58) Field of Classification Search
   None
   See application file for complete search history.

(56) References Cited

U.S. PATENT DOCUMENTS

| 4,335,427 A | * | 6/1982 | Hunt | H04N 5/3205 348/E5.089 |
| 4,789,235 A | * | 12/1988 | Borah | A61B 3/113 351/210 |

(Continued)

FOREIGN PATENT DOCUMENTS

| SE | EP 2298155 A2 * | 3/2011 | ............. A61B 3/113 |
| WO | 2003025869 | 3/2003 | |
| WO | WO03093947 | 11/2003 | |

OTHER PUBLICATIONS

Altmann, Gerry TM, and Yuki Kamide "The real-time mediation of visual attention by language and world knowledge: Linking anticipatory (and other) eye movements to linguistic processing" Journal of Memory and Language 57.4 (2007): 502-518.*

(Continued)

*Primary Examiner* — Michelle Entezari
(74) *Attorney, Agent, or Firm* — Tope-McKay & Associates

(57) ABSTRACT

Described is a system for detecting objects of interest in imagery. The system is configured to receive an input video and generate an attention map. The attention map represents features found in the input video that represent potential objects-of-interest (OI). An eye-fixation map is generated based on a subject's eye fixations. The eye-fixation map also represents features found in the input video that are potential OI. A brain-enhanced synergistic attention map is generated by fusing the attention map with the eye-fixation map. The potential OI in the brain-enhanced synergistic attention map are scored, with scores that cross a predetermined threshold being used to designate potential OI as actual or final OI.

24 Claims, 10 Drawing Sheets

Related U.S. Application Data which is a continuation-in-part of application No. 12/214,259, filed on Jun. 16, 2008, now Pat. No. 8,363,939.

(60) Provisional application No. 60/944,042, filed on Jun. 14, 2007, provisional application No. 61/714,689, filed on Oct. 16, 2012.

(56) References Cited

U.S. PATENT DOCUMENTS

| | | | | |
|---|---|---|---|---|
| 4,859,050 | A * | 8/1989 | Borah | A61B 3/113 351/210 |
| 6,102,870 | A * | 8/2000 | Edwards | A61B 5/16 600/558 |
| 6,670,963 | B2 | 12/2003 | Osberger | |
| 7,120,880 | B1 * | 10/2006 | Dryer | G06Q 30/02 715/831 |
| 7,680,295 | B2 | 3/2010 | Yoda et al. | |
| 7,930,199 | B1 * | 4/2011 | Hill | G06F 17/30259 382/118 |
| 8,265,743 | B2 * | 9/2012 | Aguilar | A61B 3/113 600/544 |
| 8,487,959 | B1 * | 7/2013 | Khan | G06F 3/013 345/619 |
| 9,466,130 | B2 * | 10/2016 | Scarff | G06T 11/001 |
| 2004/0088726 | A1 | 5/2004 | Ma et al. | |
| 2004/0165784 | A1 | 8/2004 | Xie et al. | |
| 2005/0047647 | A1 | 3/2005 | Rutishauser et al. | |
| 2007/0173699 | A1 | 7/2007 | Mathan et al. | |
| 2007/0236488 | A1 | 10/2007 | Mathan et al. | |
| 2008/0056611 | A1 | 3/2008 | Mathan et al. | |
| 2009/0245626 | A1 | 10/2009 | Norimatsu et al. | |
| 2010/0226564 | A1 | 9/2010 | Marchesotti et al. | |
| 2011/0270123 | A1 * | 11/2011 | Reiner | A61B 6/463 600/558 |
| 2013/0021578 | A1 * | 1/2013 | Chen | G06K 9/00604 351/209 |
| 2013/0216094 | A1 * | 8/2013 | DeLean | G06K 9/00335 382/103 |

OTHER PUBLICATIONS

Sun, Y., et al., "Frobabilistic judgment by a coarser scale: behavioral and ERP evidence," in Proceedings of the Twenty-sixth Annual meeting of the Cognitive Science Society, 2004.
Thorpe, S., et al., "Speed of processing in the human visual system," Nature, vol. 381, pp. 520-522, 1996.
University of California, San Diego Complex Systems and Cognition Laboratory, CSCLAB Image Database http://csclab.ucsd.edu/labeledimages.php, 2006.
Walther D., et al, "Attentional selection for object recognition—a gentle way," Lecture Notes in Computer Science 2525: 472-479, 2002.
Wolfe, J.M., "Visual Search in continuous, naturalistic stimuli," Vision Research 34: 1187-1195, 1994.
Vazirani, V., "Approximation Algorithms," Springer-Verlag, Berlin, Germany. pp. 32-33 (2004).
Vogel, E.K., et al., "The Visual NI Component as an index of a discrimination process." Psychophysiology, 2000.
Yamaguchi, S., et al., "Cerebral Asymmetry of the 'Top-down' allocation of attention to global and local features." The Journal of Neuroscience, 20, 1-5. 2000.
Zanq H., et al., "SVM-KNN: Discriminative nearest neighbor classification for visual category recognition," CVPR 2006 26.
Vazirani, V., "Approximation algonithms." Springer-Verlag, Berlin, Germany, p. 32, 2004.
http://en.wikipedia.org/Travelling_salesman_problem, Dec. 2, 2009.
Richard P. Wildes, "A measure of motion salience for surveillance applications" in Proc. IEEE Int'l Conf. Image Processing, 1998.
A bio-inspired method and system for visual object-based attention and segmentation David J. Huber, Deepak Khosla, Automatic Target Recognition XX: Acquisition, Tracking, Pointing, and Laser Systems Technologies XXIV; Optical Pattern Recognition XXI, Proc of SPIE vol. 7696, 769613.
Bio-inspired "Surprise" for Real-Time Change Detection in Visual Imagery, David J. Huber, Deepak Khosla, Automatic Target Recognition XXI, Proc. of SPIE vol. 8049 804904-1 (TICR 11-087).
L. Itti, C. Koch, E. Niebur, A Model of Saliency-Based Bisual Attention for Rapid Scene Analysis, IEEE Transactions on Pattern Analysis and Machine Intelligence, vol. 20, No. 11, pp. 1254-1259, Nov. 1998.
F. Baluch, L. Itti, Mechanisms of Top-Down Attention, Trends in Neuroscience, vol. 34, pp. 210-224, Mar. 2011.
L. Itti, P. F. Baldi, Bayesian Surprise Attracts Human Attention, In: Advances in Neural Information Processing Systems, vol. 19 (NIPS*2005), pp. 547-554, Cambridge, MA;MIT Press, 2006.
V. Navalpakkam, L. Itti, An Integrated Model of Top-down and Bottom-up Attention for Optimal Object Detection, In: Proc. IEEE Conference on Computer Vision and Pattern Recognition (CVPR), pp. 2049-2056, Jun. 2006.
Learning to predict where humans look, T. Judd, K. Ehinger, F. Durand, and A. Torralba, IEEE International Conference on Computer Vision (ICCV), 2009.
The role of context in object recognition, A. Oliva, A. Torralba, Trends in Congnitive Sciences, vol. 11(12), pp. 520-527, Dec. 2007.
C. Chamaret, O. Le Meur and J.C. Chevet, Spatio-temporal combination of saliency maps and eye-tracking assessment of different strategies, ICIP, pp. 1077-1080, 2010.
O. Le Meur, P. Le Callet and D. Barba, Predicting visual fixations on video based on low-level visual features, Vision Research, vol. 47/19 pp. 2483-2498, Sep. 2007.
Andoni A., et al., "Near-Optimal Hashing Algorithms for Near Neighbor Problems in High Dimensions," Proceedings of the Symposium on Foundations of Computer Science (FOCS'06), 2006.
Bentin, S., et al., "Electrophysiological studies of face perception in humans." Journal of Cognitive Neuroscience, 8, 551-565. 1996.
Berg A., "Shape matching and object recognition," Ph.D. thesis, UC Berkeley, Computer Science Division, Berkeley, CA, Dec. 2006.
Berka, C., et al., "Evaluation of an EEG—workload model in an aegis simulation environment" in Proceedings of SPIE Defense and Security Symposium, 90-99, 2005.
Bhattacharyya, R., et al., "Optimal image ordering for rapid serial visual presentation using etectroencephalography," Presented at Society of NeuroScience (SfN), annual meeting. Chicago, 2009.
Carpenter G.A., et al., "A massiveiy parallel architecture for a self-organizing neural pattern recognition machine," Computer Vision, Graphics, and Image Processing, 37, 54-115, 1987.
Carpenter G. A., et al., "The what-and-where filter a spatial mapping neural network for object recognition and image understanding," Computer Vision and Image Understanding. 69, 1-22, 1998.
Carpenter G.A., "Default ARTMAP," in Proc. Of the International Joint Conference on Neural Networks (IJCNN'03), 1396-1401, 2003.
Carpenter G.A., et al., "Self-organizing information fusion and hierarchical knowledge discovery: a new framework using ARTMAP neural networks," Neural Networks, 18, 287-295, 2005.
Cowell, et al., "Construction and validation of neurophysio-technological framework for imagery analysis," in J. Jacke (Ed.): Human-Computer Interaction, Part II, HCII 2007, LNCS 4551, pp. 1096-1106, 2007, © Springer-Verlag Berlin Heidelberg.
Draper B., et al., "Evaluation of Selective Attention under Similarity Transforms," In Workshop on Performance and Attention in Computer Vision. Graz, Austria, Apr. 2003.
Eckhorn R., et al., "Coherent Oscillations: A Mechanism of feature linking in the visual cortex?" Biological Cybernetics 60, 121-130, 1988.
Eimer, M., "Does the face-specific N170 component reflect the activity of a specialized eye processor?" Neuroreport 9, 2945-2948, 1998.
Fabre-Thorpe, M., et al., "A limit to the speed of processing in Ultra-Rapid visual categorization of novel natural scenes," Journal of Cognitive Neuroscience, 13, 171-180, 2001.

(56) References Cited

OTHER PUBLICATIONS

Field D.J., "Relations between the statistics of natural images and the response properties of cortical cells," J. Opt. Soc. Am. A., 4: 2379-2394, 1987.

Fei-Fel L. et al., "Learning generative visual models from few training examples: an incremental Bayesian approach tested on 101 object categories," CVPR 2004, Workshop on Generative-Model Based Vision, 2004.

Gerson. A.D., et al., "Codically coupled computer vision for rapid image search" IEEE Transactions on Neural Systems one Rehabilitation Engineering, 14(2): 174-179, Jun. 2006.

Gladwell. M., "Blink: the power of thinking without thinking" 1st ed. Little, brown and company Time Warner Book Group, New York, 2005, pp. 18-47.

Gutin, G., et al., "Traveling salesman should not be greedy: domination of analysis of greedy-type heuristics for the TSP," Discrete Applied Mathematics, 117: 81-86, 2002.

Gray C M., et al., "Oscillatory Responses in Cat visual cortex exhibit intercolumar synchronization which reflects global stimulus properties," Nature 335: 334-336; 1969.

Hopf, J -M., et al., "Localizing visual discrimination processes in time and space," The American Physiological Society, 88, 2088-2095, 2002.

Itti, L., et al., "A saliency-basad search mechanism for overt and covert shifts of visual attention," Vision Research, 40: 1489-1506, 2000.

Itti L., et al., "A Model of Saliency-Based Visual Attention for Rapid Scene Analysis," IEEE Transaction on Pattern Analysis and Machine Intelligenee, 20, 1254-1259, 1998.

Itti L., et al., "Bayesian Surprise Attracts Human Attention," Vision Research 49: 1295-1306, 2008.

Itti, L., et al., "Computational Modeling of Visual Attention," Nature Reviews Neuroscience, 2, 194-203, 2001.

Itti, L., "Quantifying the Contribution of low-level saliency to human eye movements in dynamic scenes," Visual Cognition, 12, 1093-1123, 2005.

Keysers, C., et al., "The Speed of Sight," Journal of Cognitive Neurosciences, 13(1), 90-101, 2001.

Khosla D., et al., "Bio-Inspired Visual Attention and Object Recognition," In: Proc. SPIE Defense, Security, and Sensing, 6560, 656003, 2007.

Khosla, D., et al., "A bio-inspired system for spation-temporal recognition in static and video imagery," Proc. SPIE 6560, 656002, 2007.

Koch C., et al., "Shifts in selective visual attention: towards the underlying neural circuitry." Human Neurobiology, 4: 219-227, 1985.

Lazebnik S., et al., "Beyond Bags of Features: spatial pyramid matching for recognizing natural scene categories." In: Proc. IEEE Conference on Computer Vision and Pattern Recognition (CVPR), 2006.

Ling, H., et al., "Diffusion distance for histogram comparison," IEEE Computer Society Conference on Computer Vision and Pattern Recognition (CVPR), 2006.

Medasani, S., et al., "Possibilistic particle swarms for optimization," Proceedings 5673 of SPIE/IST Symposium on Electronic Imaging, 2005.

Medasani, S., et al., "Active learning system for object fingerprinting," International Joint Conference on Neural Networks, 2004.

Morrison, D., et al., "Semantic clustering of images using patterns of relevance feedback," in Proceedings of the 6th International Workshop on Content-based Multimedia Indexing (CBMI 2008), London, UK.

Nane S.A., et al., "Columbia Object Image Library (COIL-100)," Technical Report CUCS-006-96, Feb. 1996.

Navalpakkam V., et al., Modeling the Influence of Task on Attention. Vision Research, 45: 205-231, 2005.

NavalpakkamV., et al., "An integrated model of top-down and bottom-up attention for optimal object detection," In: Proc. IEEE Conference on Computer Vision and Pattern Recognition (CVPR), 1-7. 2006.

Navalpakkam V., et al., "Sharing resources: buy attention, get recognition," In: Proc. International Workshop on Attention and Performance in Computer Vision (WAPCV'03), Graz, Austria, Jul. 2003.

Navalpakkam, V, et al., "Search goal tunes visual features optimally,"Neuron, 53, 605-617, 2007.

Niebur E., et al., "Control of selective visual attention modeling the 'where' pathway." In D. Touretzky, M Mozer and M. Hasselmo. Neural Information Processing Systems (NIPS 8), 802-808, Cambridge, MA, MIT, Press 1996.

Orabona F., at al., "Object-based Visual Attention: A Model for a Behaving Robot," In 3rd International Workshop on Attention and Performance in Computational Vision (in CVPR 2005), San Diego, CA, Jun. 2005.

Owechko, Y., et al., "A swarm-based volition/attention framework for object recognition," IEEE Conference on Computer Vision and Pattern Recognition, San Diego, 2005.

Owechko, Y., et al., "Cognitive swarms for rapid detection of objects and associations in visual imagery." IEEE Swarm Intelligence Symposium, 2005.

Peters, R.J., et al., "Beyond bottom-up: Incorporating task-dependent influences into computational model of spatial attention," in: Proc. IEEE Conference on Computer Vision and Pattern Recognition (CVPR), 2007.

Rogowitz, B.E., et al., "Perceptual image similiarity experiments," Proceedings of SPIE, 3299: 576-590, 1998.

Scholl B.J., "Objects and Attention: the state of the art," Cognition 80, 1-46, 2001.

Serre T., et al., "Object recognition with features inspired by visual cortex." in Proceedings of the IEEE conference on computer vision and pattern recognition (CVPR), San Diego, CA, Jun. 2005.

Smeulders, A., et al., "Content-based image retrieval at the end of the early years," IEEE Transactions on PAMI, 22 (12): 1349-1380, 2000.

Sun Y., et al., "Hierarchical selectivity for object-based visual attention," Submitted to Artificial Intelligence, 2004.

Notice of Allowance for U.S. Appl. No. 12/982,713, date mailed: Feb. 28, 2014.

Einhauser et al. (Jul. 20, 2007) "A bottom-up model of spatial attention predicts human error patterns in rapid scene recognition," J. Vision, vol. 7 No. 10 Art. 6, pp. 1-13.

Itti et al. (Jun. 2005) "A principled approach to detecting surprising events in video." Proc 2005 IEEE CS Conf. on Computer Vision and Pattern Recognitton, vol. 1 pp. 631-637.

Mundhenk et al. (Jul. 2009) "Automatic computation of an image's statistical surprise predicts performance of human observers on a natural imgae detection task." Vision Research, Vol. 49 No. 13, pp. 1620-1637.

Xu et al. (Dec. 2008) "Looking at the surprise. Bottom-up attentional control of an active camera system" Proc. 10th IEEE Intl Conf. on Control, Automation, Robotics, and Vision, pp. 637-642.

Office Action 1 for U.S. Appl. No. 12/214,259. date mailed: Dec. 15, 2011.

Office Action 1 Response for U.S. Appl. No. 12/214,259, date mailed: Mar. 15, 2012.

Office Action 2 for U.S. Appl. No. 12/214,259, date mailed: Apr. 18, 2012.

Office Action 2 Responseor U.S. Appl. No. 12/214,259, date mailed: Jul. 18, 2012.

Notice of Allowance for U.S. Appl. No. 12;214,259, date mailed: Aug. 21, 2012.

Walther et al. (Jun. 2005) "Selective visual attention enables learning and recognition of multiple objects in cluttered scenes." Computer Vision and image Understanding, vol. 100 pp. 41-63.

Ng et al. (Jun. 2006) "Medical image segmentation using k-means clustering and improved watershed algorithm." Proc. 2006 IEEE Southwest Symp. on Image Analysis and Interpretation, pp. 61-65.

(56) References Cited

OTHER PUBLICATIONS

Fussenegger et al. (Aug. 2004) "Object recognition using segmentation for feature detection." Proc. 1 th IEEE Int'l Conf. on Pattern Recognition, vol. 3 pp. 41-44.
Khosla, D. (Sep. 2006) "Biologically-inspired cognitive architecture for integrated learning, action and perception (BICALEAP)," HRL Laboratories, LLC. DARPA/I PTO Final Report N00014-05-C-051 0.
Siagian et al. (Jun. 2005) "Gist: A mobile robotics application of context-based vision in outdoor environment" Proc. 2005 IEEE Comp. Sci. Conf. on Computer Vision and Pattern Recognition, pp. 88+.
Navalpakkam et al. (2006) "An integrated model of top-down and bottom-up attention for optimizing detection speed." 2006 IEEE Comp Sci. Conf. on Computer Vision and Pattern Recognition, vol. 2 pp. 2049-2056.
Ray et al. (1999) "Determination of number of clusters in K-Means clustering and application in colour image segmentation." Proc. 4th Int'l Conf. on Advances in Pattern Recognition and Digital Techniques, pp. 137-143.

\* cited by examiner

SYSTEM AND METHOD FOR DETECTION OF OBJECTS OF INTEREST IN IMAGERY

CROSS-REFERENCE TO RELATED APPLICATIONS

This is a Continuation-in-Part of U.S. application Ser. No. 12/982,713, filed on Dec. 30, 2010, and entitled, "System for Identifying Regions of Interest in Visual Imagery," which is a Continuation-in-Part of U.S. application Ser. No. 12/214,259, filed on Jun. 16, 2008, and entitled, "Visual Attention and Segmentation System" now U.S. Pat. No. 8,363,929, which was a non-provisional application of U.S. Provisional Application No. 60/944,042, filed on Jun. 14, 2007, and entitled, "Bio-Inspired System for Visual Object-Based Attention and Segmentation".

This is ALSO a Non-Provisional Utility Patent Application of U.S. Provisional Application No. 61/714,689, filed on Oct. 16, 2012, and entitled, "Brain-Enhanced Synergistic Attention (BESA) for High Accuracy Detection of Objects of Interest in Imagery."

GOVERNMENT LICENSE RIGHTS

This invention was made with government support under U.S. Government Contract Number W31P4Q-08-C-0264, issued by DARPA-DSO. The government has certain rights in the invention.

BACKGROUND OF THE INVENTION (1) Technical Field

The present invention relates to an object detection system and, more particularly, to a system, method, and computer program product for detecting objects-of-interest in stored or live dynamic imagery by fusing cognitive algorithms with a human analyst to improve the accuracy of detection.

(2) Description of Related Art

Most imagery is visually analyzed by humans to search for objects-of-interest (e.g., targets and suspicious activity in videos from drones, satellite imagery, etc.). Such manual video analysis is slow and prone to human error, such as missing potential objects-of-interest. A large volume of imagery is also never reviewed because of human analyst resource shortage. To overcome these limitations, there has been a surge of interest in developing and using automated computer algorithms and software to aid or/and emulate human visual perception in imagery analysis. By way of example, Huber et al. previously described various cognitive algorithms for rapid threat search and detection (see the List of Cited Literature References, Literature Reference Nos. 1 and 2). However, while these algorithms help and perform reasonably well, they are still limited in what they can detect because it is difficult to model human search behavior.

It is well known that humans employ a combination of bottom-up and top-down cues when searching for objects-of-interest. Most work in the area of cognitive algorithms has still been focused on modeling bottom-up attention (see Literature Reference Nos. 1 through 3). There is some limited work on modeling top-down attention, i.e., capturing human top-down biases and knowledge to build algorithms that predict or emulate where humans would look in imagery (see Literature Reference Nos. 4-8). However, these methods are usually ad hoc and do not perform well. Such top-down methods also use either knowledge of prior imagery from fixed cameras (spatial context) or look for known objects with training on several examples of a same object (object context). In the latter case, a system can then find these known objects and not be required to have the sensitivity to find new objects-of-interest. As a result existing methods do not typically have applicability to real-world imagery and the ability to detect new objects-of-interest in the imagery.

Attention models are usually compared against human eye tracking data on the same imagery to determine how good the models are in detecting objects that a human fixates on (see Literature Reference Nos. 3, 7, 9-10). As expected, there is low correlation between human fixation and typical attention models. No model or algorithm can capture the full intent of a human nor will a human be completely replaced by an algorithm.

Thus, a continuing need exists for a system for detecting objects-of-interest in stored or live dynamic imagery by fusing cognitive algorithms and a human analyst to improve the accuracy of detection.

SUMMARY OF INVENTION

The present invention is directed to a system, method, and computer program product for detecting objects-of-interest in stored or live dynamic imagery by fusing cognitive algorithms with a human analyst to improve the accuracy of detection. In one aspect, the system includes one or more processors and a memory with the memory having instructions encoded thereon. Upon execution of the instructions, the one or more processors perform a series of operations. For example, the system receives an input video and generates an attention map representing features found in the input video that represent potential objects-of-interest. An eye-fixation map is generated that represents features found in the input video that, based on a subject's eye fixations, are potential objects-of-interest. A brain-enhanced synergistic attention map is generated by fusing the attention map with the eye-fixation map, the brain-enhanced synergistic map having a collection of potential objects-of-interest from both the attention map and eye-fixation map. The potential objects-of-interest in the brain-enhanced synergistic attention map are scored such that those scores that cross a predetermined threshold can be designated as final objects-of-interest.

In another aspect, the system generates a masked map that masks the potential objects-of-interest in the attention map and combines the masked map with the input video to generate a masked video having unmasked regions and masked regions. The masked regions mask the potential objects-of-interest as generated by the attention map. The masked video is presented (e.g., visually) to a subject and data is collected regarding the subject's eye fixations on the masked video. Further, the eye-fixation map is generated based on the subject's eye fixations.

In another aspect, in collecting data regarding the subject's eye fixations on the masked video, a fixation includes the data points, within a temporal window, having an agreement in spatial position that exceeds a threshold.

In another aspect, generating an attention map further comprises an operation of receiving a series of consecutive frames representing a scene as provided for in the input video, the frames having at least a current frame and a previous frame. A surprise map can then be generated based on features found in the current frame and the previous frame, the surprise map having a plurality of values corresponding to spatial locations within the scene. A surprise is determined in the scene based on a value in the surprise map exceeding a predetermined threshold, the surprise being a potential object-of-interest in the attention map.

In another aspect, combining the masked map with the input video to generate a masked video further comprises an operation of masking each frame independently of each other frame such that there is no temporal continuity of the masking across frames.

In yet another aspect, masking each frame independently further comprises an operation of blacking out the masked regions while maintaining original pixel values in the unmasked regions.

In another aspect, masking each frame independently further comprises an operation blurring the masked region by convolving the masked region with a Gaussian smoothing kernel.

In another aspect, combining the masked map with the input video to generate a masked video further comprises operations of determining if a potential object-of-interest in the masked map is in M out of N frames, where both M and N are greater than one, and if so, then designating a region associated with the potential object-of-interest as a masked region for all of the N frames; and blurring the masked region by convolving the masked region with Gaussian smoothing kernels of different sizes.

As can be appreciated by one skilled in the art, the present invention also comprises a method for causing a processor to perform the operations described herein.

Finally, the present invention also comprises a computer program product comprising computer-readable instruction means stored on a non-transitory computer-readable medium that are executable by a computer having one or more processors for causing the processor(s) to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
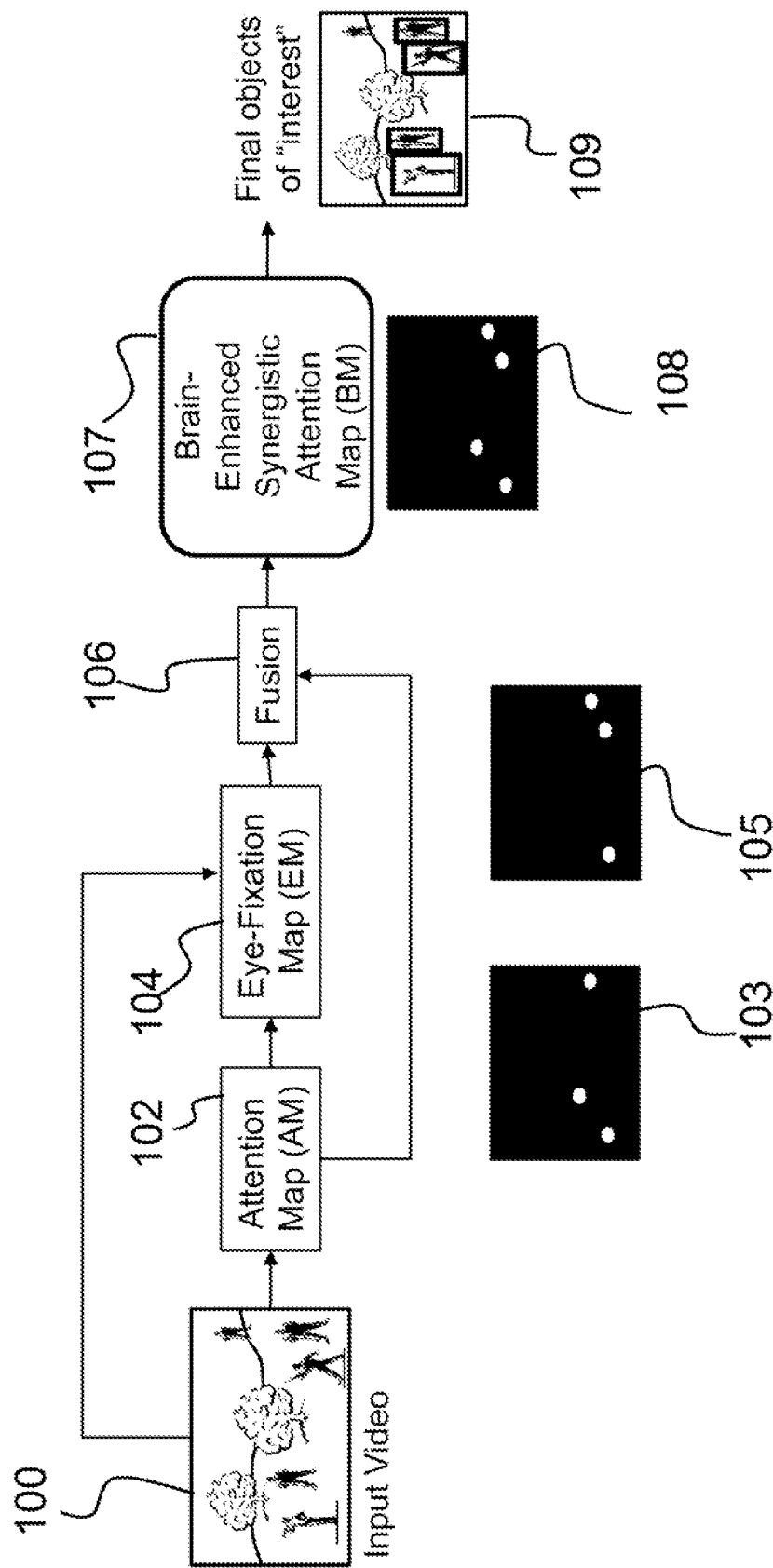
FIG. 1 is a block diagram illustrating processing flow of a Basic Brain-Enhanced Synergistic Attention (BESA) system according to the principles of the present invention.

The present invention relates to an object detection system and, more particularly, to a system and method for detecting objects-of-interest in stored or live dynamic imagery by fusing cognitive algorithms and a human analyst to improve the accuracy of detection. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of the present invention are provided to give an understanding of the specific aspects.

(1) LIST OF CITED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number.

1. *A bio-inspired method and system for visual object-based attention and segmentation* David J. Huber, Deepak Khosla, Automatic Target Recognition XX;

Acquisition, Tracking, Pointing, and Laser Systems Technologies XXIV; Optical Pattern Recognition XXI, Proc. of SPIE Vol. 7696, 769613.
2. *Bio-inspired "Surprise" for Real-Time Change Detecion in Visual Imagery*, David J. Huber, Deepak Khosla, Automatic Target Recognition XXI, Proc. of SPIE Vol. 8049 804904-1 (TICR 11-087).
3. L. Itti, C. Koch, E. Niebur, A Model of Saliency-Based Visual Attention for Rapid Scene Analysis, *IEEE Transactions on Pattern Analysis and Machine Intelligence*, Vol. 20, No. 11, pp. 1254-1259, November 1998.
4. F. Baluch, L. Itti, Mechanisms of Top-Down Attention, *Trends in Neurosciences*, Vol. 34, pp. 210-224, March 2011.
5. L. Itti, P. F. Baldi, Bayesian Surprise Attracts Human Attention, In: *Advances in Neural Information Processing Systems*, Vol. 19 (NIPS*2005), pp. 547-554, Cambridge, Mass.:MIT Press, 2006.
6. V. Navalpakkam, L. Itti, An Integrated Model of Top-down and Bottom-up Attention for Optimal Object Detection, In: *Proc. IEEE Conference on (Computer Vision and Pattern Recognition (CVPR). pp.* 2049-2056, June 2006.
7. Learning to predict where humans look, T. Judd, K. Ehinger. F. Durand, and A. Torralba, IEEE International Conference on Computer Vision (ICCV), 2009.
8. The role of context in object recognition, A. Oliva, A. Torralba, Trends in Cognitive Sciences, vol. 11(12), pp. 520-527. December 2007.
9. C. Chamaret, O. Le Meur and J. C. Chevet, *Spatio-temporal combination of saliency maps and eye-tracking assessment of different strategies*, ICIP, pp. 1077-1080, 2010.
10. O. Le Meur, P. Le Callet and D. Barba, *Predicting visual fixations on video based on low-level visual features*, Vision Research, Vol. 47/19 pp 2483-2498, September 2007.
11. U.S. patent application Ser. No. 12/982,713, filed on Dec. 30, 2010, and entitled, "System for Identifying Regions of Interest in Visual Imagery".
12. U.S. patent application Ser. No. 13/743,742, filed on Jan. 17, 2013, and entitled, "Method and System for Fusion of Fast Surprise and Motion-Based Saliency for Finding Objects of Interest in Dynamic Scenes."
13. U.S. patent application Ser. No. 13/669,269, filed on Nov. 5, 2012, and entitled, "Motion-Seeded Object Based Attention for Dynamic Visual Imagery."

(2) PRINCIPAL ASPECTS

The present invention has three "principal" aspects. The first is a system for detecting of objects-of-interest in imagery. The system is typically in the form of a computer system operating software or in the form of a "hard-coded" instruction set. This system may be incorporated into a wide variety of devices that provide different functionalities. For example, in one aspect, the system may include the eye-tracking device, hardware, and/or software as described herein. The second principal aspect is a method, typically in the form of software, operated using a data processing system (computer). The third principal aspect is a computer program product. The computer program product generally represents computer-readable instructions stored on any non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

(3) INTRODUCTION

Described is a system and method for detecting objects-of-interest (OI) (e.g., targets, suspicious events) from stored or live dynamic imagery (images and video). The process combines a bio-inspired Attention Map (AM) derived from cognitive algorithms (e.g., see Literature Reference No. 11), which uses bottom-up features, with a human real-time Eye-fixation Map (EM), which uses top-down information, into a single "Brain-Enhanced Synergistic Attention" (BESA) map (BM) to maximize high accuracy detections of OI with low false positives. The system can be used as a front-end to a larger system that includes object recognition and scene understanding modules.

Through fusing the best of algorithm detections with human analyst detections, the system detects OI in imagery with high accuracy and better than either a computer algorithm or human alone. In addition to a basic fusion, the system also uses AM to derive a Masking Map (MM) that is then combined with raw video to create masked video. This masked video draws human attention and eye-fixations to hard-to-detect targets, thereby further increasing OI detection accuracy.

A basic premise of the present invention is that cognitive algorithms are inherently bottom-up and may additionally capture some aspects of top-down attention (e.g., spatial context), while humans fixate on regions of video based on a much stronger top-down component. It is difficult to fully capture all aspects of human top-down cognition in cognitive algorithms. Combining cognitive algorithm and human fixation maps will provide an ideal combination of fast, bottom-up automated processing and slow, deliberate top-down cognition. Furthermore, fixation can be guided to regions by masking out the cognitive algorithm high score areas, i.e., in essence presenting the "negative attention" video to the user to maximize fixation on hard-to-detect targets that the cognitive algorithm may have missed.

The system according to the principles of the present invention is useful for any application that monitors a scene for the purpose of finding interesting or unusual regions or occurrences. For example, it can be employed to search and rescue operations or in surveillance applications where any activity is an unexpected occurrence, such as in a desert or mountain range, or on the open sea. Furthermore, this system can be used as a front-end for any application that employs visual object recognition and scene understanding to extract regions of interest for identification. Other examples of potential applications include automotive safety, factory safety and efficiency, autonomous systems, robotics, intelligence analysis, etc.

(4) SPECIFIC DETAILS OF THE INVENTION

The system combines the best of both bottom-up and top-down detections, i.e., cognitive algorithms and human analyst to improve the accuracy of detection. A simple fusion of detection by each provides improvements over either. This approach is called basic BESA. A masking scheme provides even further improvements by drawing human eye fixations to hard-to-detect OI. Thus, described are two methods for computing BESA and using it to detect OI. Each of Basic BESA and the Masking Map (MM) are described in further detail below.

(4.1) Basic BESA

A block diagram of the basic BESA is shown in FIG. 1. Input video 100 from recorded media or sensor(s) are sent to both the Attention Map (AM) 102 and Eye-Fixation Map (EM) 104 modules, each of which processes the video 100 independently and outputs a corresponding AM map 103 and EM map 105 for each frame of the video 100. In the desired aspect, the output maps (e.g., 103 and 105) are the same size as the input and each pixel value is in the range of 0-1.

High values correspond to regions in the scene (video) that contain potential "objects-of-interest" (i.e., target). The AM map 103 and EM map 105 are then fused with a fusion module 106 (e.g., scores are normalized and the normalized scores are fused, to produce an output fusion map 107 (or BESA map (BM)). An example of a fusion map 107 (or BM) is illustrated as element 108. Thereafter, scores that cross a threshold in the fusion map 107 are designated as the final "objects-of-interest" in that frame 109. This is done for all frames in the video.

Figure 2:
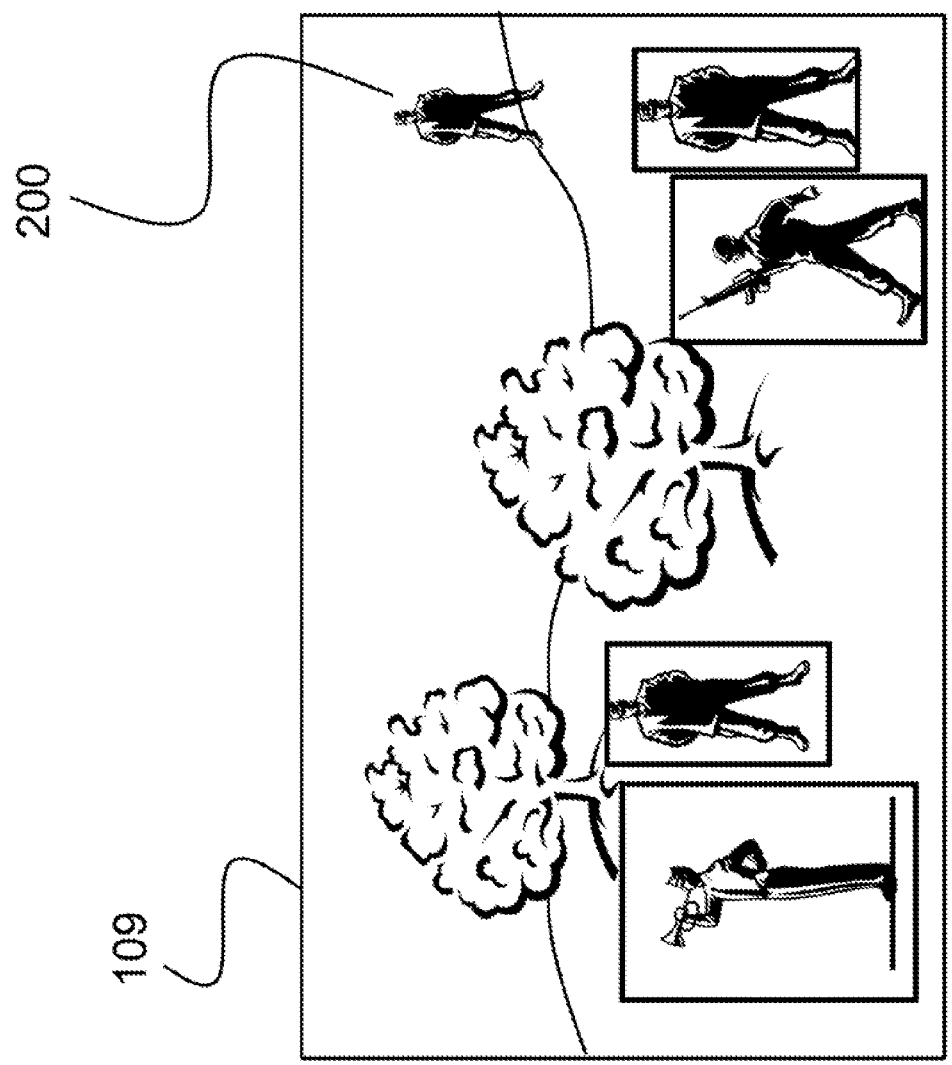
FIG. 2 is an illustration of an image illustrating that Basic BESA detects more targets than either an attention map (AM) or an eye-fixation map (EM) alone, but still missed one target in this example.

While basic BESA detects most targets, it can sometimes miss hard-to-detect objects. For example, FIG. 2 illustrates an enlarged version of the final output image 109 that is generated in the example above, one target is missed (i.e., missed target 200). The main reason is that a large percentage of targets that the human eyes are drawn to are similar to the attention map detected targets and thus humans are spending time searching for targets that the attention algorithm has already detected.

(4.2) Masked BESA

Figure 3A:
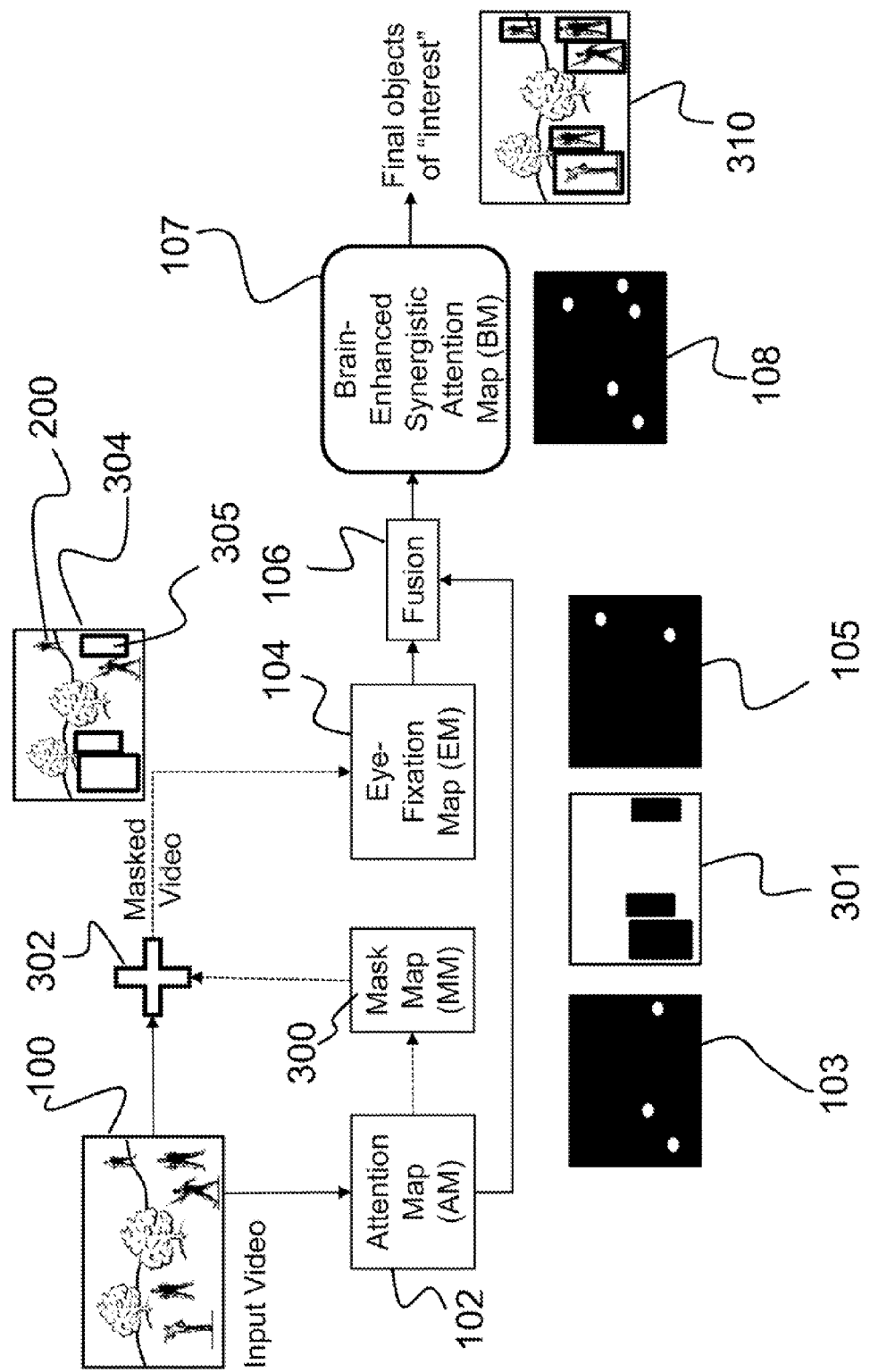
FIG. 3A is a block diagram and processing flow of a Masked BESA according to the principles of the present invention.
Figure 3B:
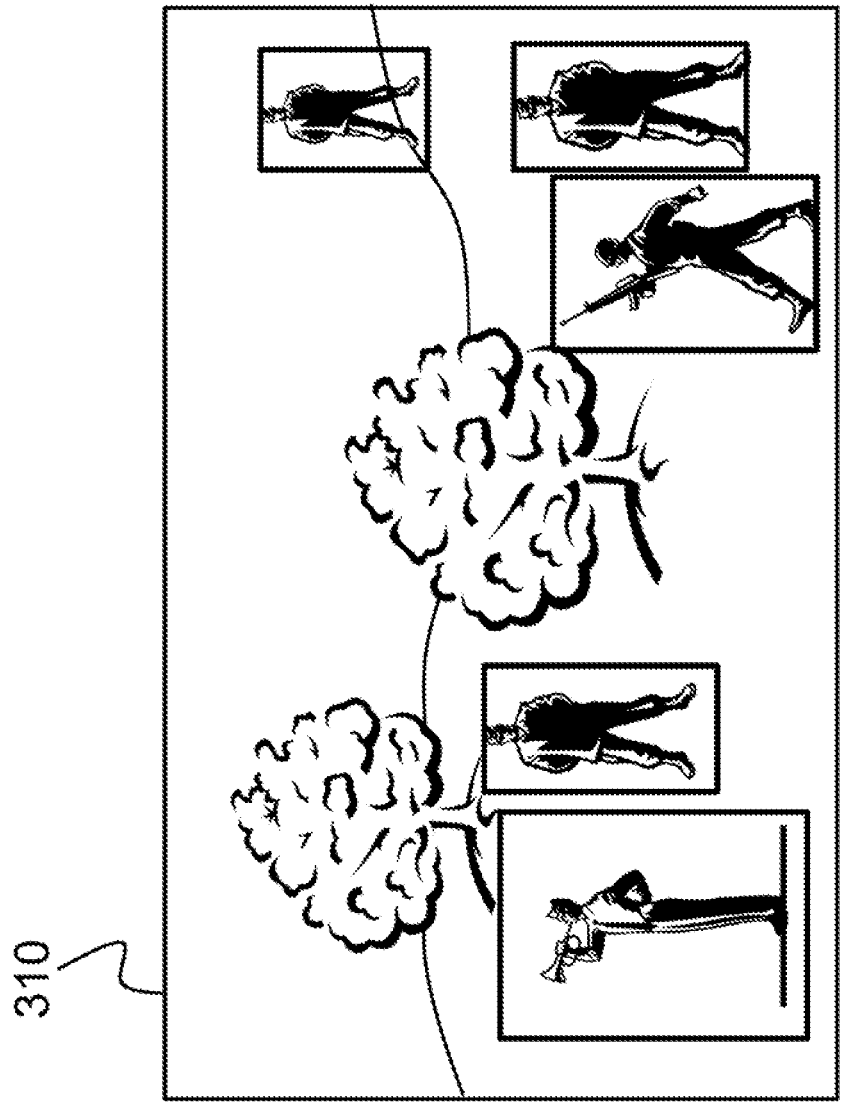
FIG. 3B is an illustration of an image illustrating that Masked BESA detected all five targets that were presented in this example.

In masked BESA, most of the processing flow is the same as originally depicted in FIG. 1 for basic BESA. However, to be contrasted with basic BESA, masked BESA (as shown in FIG. 3A) includes an additional intermediate step. Specifically, the attention map (AM) module 102 generates an attention map (AM) 103 that is used, by a Mask Map (MM) module 300, to create a Masked map 301. The Masked map 301 is then combined 302 with the original video 100 to create a Masked Video (MV) 304 which is presented to the user. The masked video MV 304 masks or blurs out regions 305 of the video that have been detected in the AM 103. Because the previously detected regions are masked, the user's attention is drawn to "potential undetected targets" (or missed targets 200), which maximizes the user's chance of detecting the missed targets 200 via eye fixation (using the eye-fixation map module 104) to generate the eye-fixation map 105. As was the case above, the AM map 103 and EM map 105 are then fused using a fusion module 106 (e.g., scores are normalized and the normalized scores are fused) to produce an output fusion map 107 (or BESA Map). Scores that cross a threshold in the fusion map 107 are designated as the final "objects-of-interest" (OI) in that frame 310. The final frame 310 with the designated OI is further illustrated in FIG. 3B. Again, this is done for all frames in the video. For further understanding, each of the processes referenced above is described in further detail below.

(4.3) Attention Map

The attention map (AM) is a map that contains features that are potential OI. The AM can be a saliency map or a surprise map and is typically bottom-up based on imagery features. Any suitable method for computing an attention map (AM) can be employed according to the principles of present invention, non-limiting examples of which include the cognitive algorithms and methods as described in Literature Reference Nos. 11, 12, and 13). For completeness, one non-limiting example of generating an attention map (AM) is described below.

Figure 4:
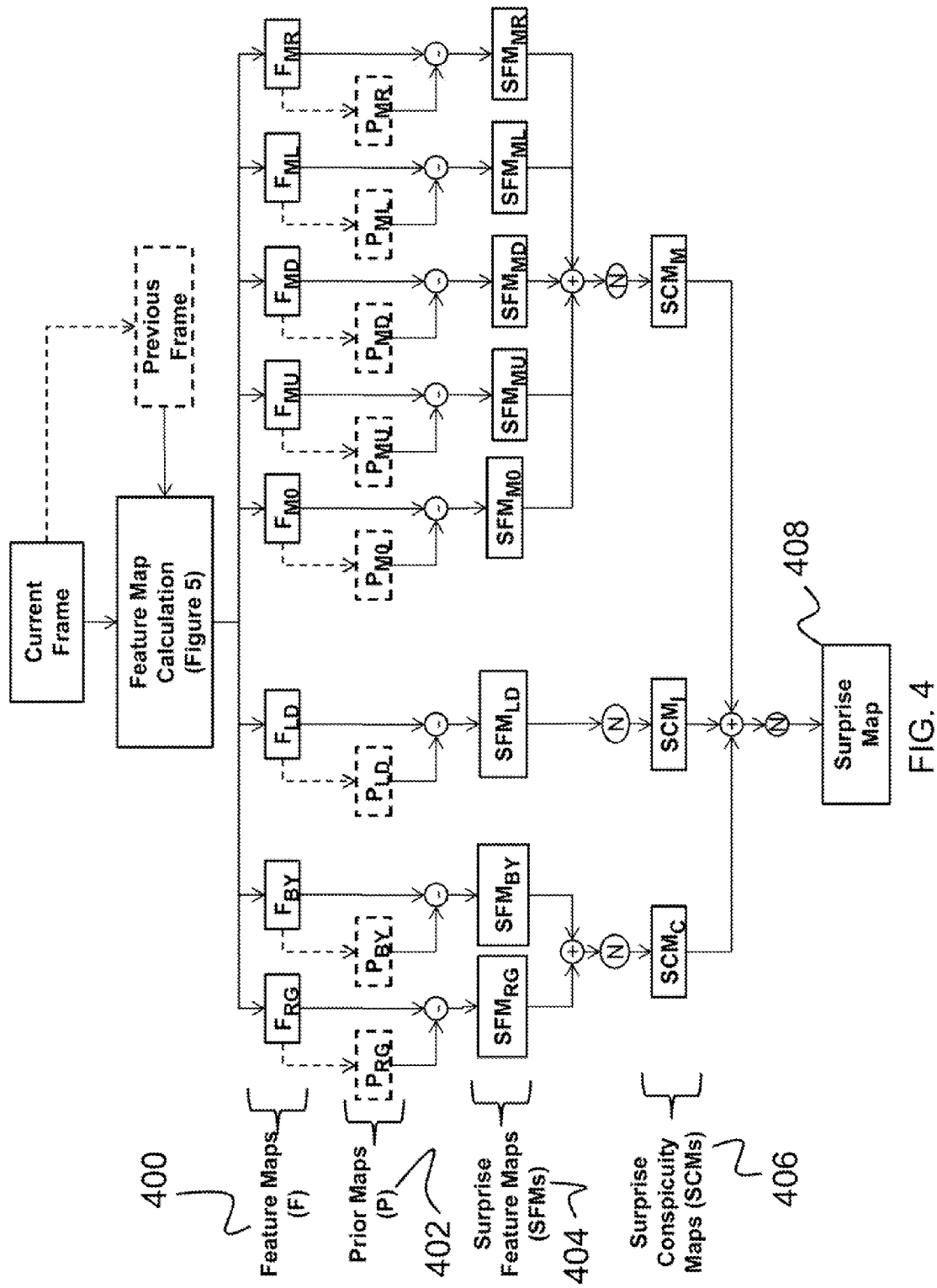
FIG. 4 is a flow diagram illustrating process flow for computing surprise according to the principles of the present invention.

The first step in the AM module 102 is to compute a series of feature maps (as shown in FIG. 4) representing color contrasts, intensities, and motion patterns from a series of consecutive static color images of a scene representative of continuous frames in an input video. FIG. 4 provides a flow diagram depicting a method for determining surprise for visual imagery. Blocks formed of dashed-lines represent modules that must be stored in memory between frames. Dashed-lines ending in arrows represent steps that are taken to prepare for the next frame, and are processed after computing the surprise for frame t, but before computing the features for frame t+1. The '−' blocks represent pixel-by-pixel rectified subtraction, while the '+' blocks represent pixel-by-pixel addition, and the 'N' blocks represent map normalization.

Figure 5:
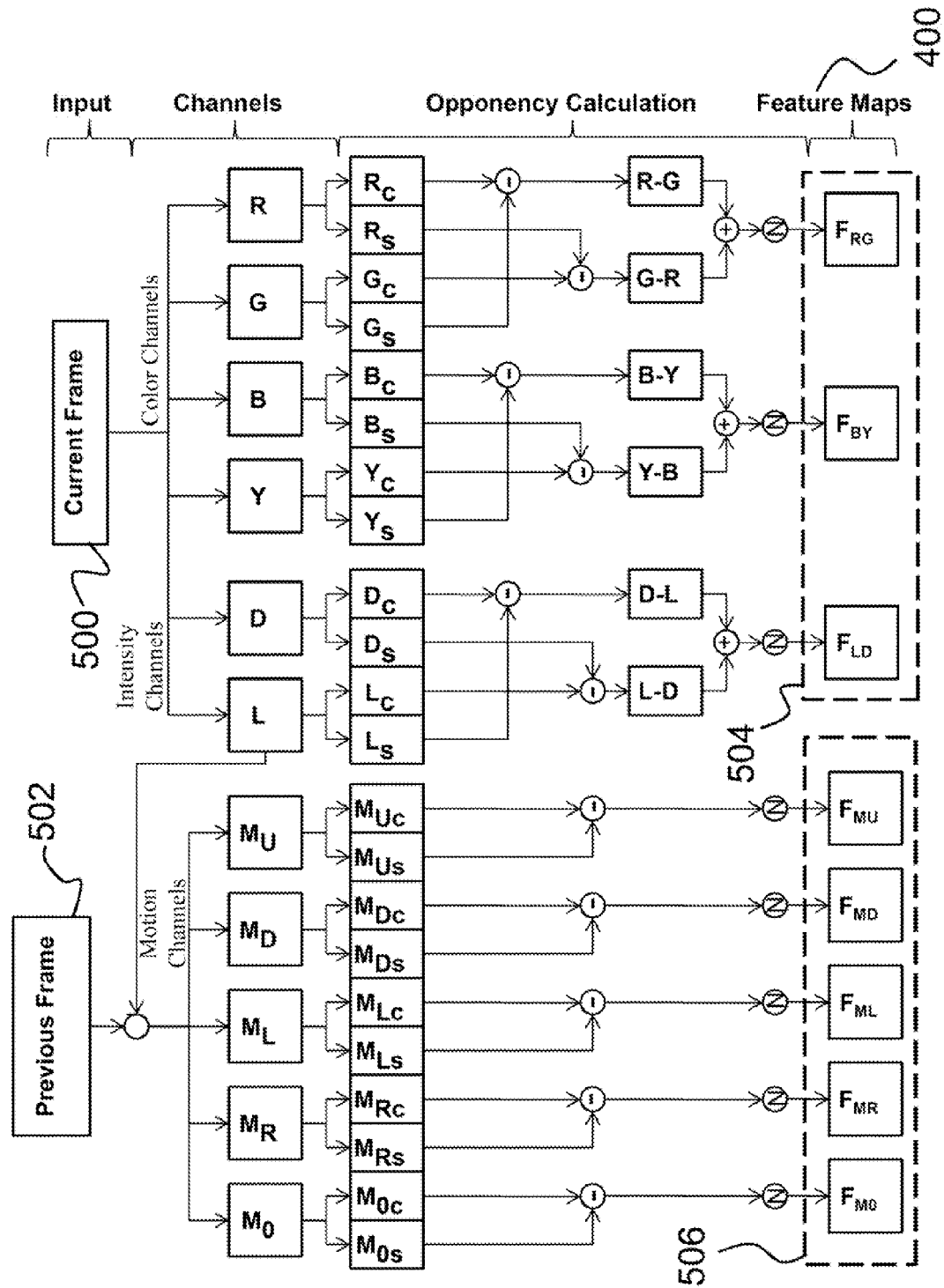
FIG. 5 is a flow diagram illustrating process flow for computing feature maps according to the principles of the present invention.

The process for generating the feature maps is further detailed in FIG. 5. As shown in FIG. 5, the process for generating a series of feature maps 400 includes receiving a series of consecutive frames (an image sequence) representing a scene as captured from N sensors (e.g., a video camera), the frames having at least a current frame 500 and a previous frame 502.

Note that although this can be the full frame or gridded sub-images, it is desirable to use gridded sub-images or chips. In this aspect, the entire image is tiled into small chips (e.g., 256×256 pixels as a nominal size or chips) that cover the full image. If the image sequence is in black and white, it is converted into an RGB format (red-channel (r), green-channel (g), and blue-channel (b)) where all three channels have the same value (retaining the black-and-white appearance) for feature map calculation. The image is further broken (split) into four fully-saturated channels (red (R), green (G), blue (B), and yellow (Y)) that yield zero-response to white, as follows:

$$R = r - \frac{(g+b)}{2}, G = g - \frac{(r+b)}{2}, B = b - \frac{(r+g)}{2}, \text{and}$$

$$Y = \frac{(r+g)}{2} - \frac{|r-g|}{2} - b.$$

Additionally, a pair of intensity channels, a light intensity channel (L) and a dark intensity channel (D), are calculated from the input image by averaging the red, green, and blue channels, as follows:

$L=(r+g+b)/3$ and $D=$(maximum value of a color channel (e.g., 255))− $L$.

These processes effectively separate the effects of the color and intensity channels. For each of these channels, all negative values are thresholded at zero. Thus, based on the method described above, four fully saturated channels and the light and dark intensity channels are generated from the current frame 500. Additionally, channels corresponding to motion in various directions are generated by differencing (comparing) the intensity channels (L) of the current and previous frames at a slight directional offset. As a non-limiting example, the differencing of the intensity channels of the previous frame and current frames can be done for the four cardinal directions: up, down, left, and right, as well as once without any offset (which detects objects that move in place or appear to "glimmer"), thereby resulting in a series of motion channels $M_U$, $M_D$, $M_L$, $M_R$, and $M_O$, respectively. While there are certainly more input channels that one might conceive and use according to the principles of the present invention, this particular set represents the most basic required for adequate performance of the surprise algorithm.

Next, a series of color feature maps 504 (i.e., $F_{BY}$, and $F_{RG}$) are generated from the color channels in the current frame using center-surround differencing between color channels. Each color feature map represents a color feature in the current frame. Further a (or series of) intensity feature map 505 (i.e., $F_{LD}$) is generated from the two intensity channels for the current frame using center-surround differencing. Each intensity feature map representing a color/intensity feature. Finally, a series of motion feature maps 506 (i.e., $F_{MO}$, $F_{MR}$, $F_{ML}$, $F_{MD}$, and $F_{MU}$) are generated from the motion channels. Each motion feature map representing a motion feature between the current and previous frame.

As can be appreciated by one skilled in the art, there may be multiple techniques for developing the color and motion feature maps 504 and 506. As a non-limiting example, center-surround color maps corresponding to the receptive fields in the retina for red-center/green surround, green-center/red-surround, blue-center/yellow-surround, bright-center/dark-surround, and dark-center/bright-surround and for the motion channels (center and surround are from motion in the same direction) are computed from the input channels from the Difference of Gaussians (DoG) between an "ON" center feature, and a contrasting "OFF" surround feature. Both the center and surround channels are convolved with a two-dimensional Gaussian kernel, where the surround kernel has larger bandwidth than the center kernel. A feature map is computed when the surround channel is subtracted from the center channel. In instances where opponency is calculated (such as with color and intensity), the opponent maps are added before normalization; this ensures that the feature map is unbiased toward one contrasting feature over another. As shown in FIG. 5, the '−' blocks represent pixel-by-pixel rectified subtraction, while the '+' blocks represent pixel-by-pixel addition, and the 'N' blocks represent map normalization. This process is repeated for each center-surround channel pairing, which includes each of the color and intensity contrasts, and the motion directions. Each feature map is normalized between zero and one. The resulting set of feature maps indicates anomalous regions along that particular feature within the still frame of the scene, and each frame in the video sequence generates its own series of feature maps 400.

Up until this point, the method for computing saliency and surprise is identical; after computing feature maps, these algorithms diverge.

Referring again to FIG. 4, after the feature maps 400 are generated, the next step is to compute a baseline or "status quo" within the scene for each feature, so that the system can detect when an event occurs that disagrees with the historical distribution of features within the scene. This is done by computing a prior map (P) 402, for each feature by integrating the sequence of feature maps over time. Each pixel (i,j) in the prior map corresponds to a specific spatial location in the original image from the camera. There are many possible ways to integrate the information from a temporal series of feature maps into a prior map, but the simplest process is through a weighted expected value (i.e., the mean) of feature maps over time, where more recent frames provide a stronger influence on the prior map than frames encountered long ago. As a non-limiting example for a given feature, x, this can be expressed for any spatial location i,j in the prior map P at the current time, t, as:

$$P_{ij}(t) = \sum_{T=0}^{t} w_x F_{ij}(T),$$

where F represents the feature map at location i,j at some previous time T. The weights, $w_x$, are a decaying sequence determined by some time constant, for example:

$$w_x = e^{<Tx},$$

with the constraint $$\Sigma_x w_x = 1$$

The method described above requires the storage of t feature maps, which is generally not difficult as these maps are generally decimated from the original image. As new frames are processed, the new feature maps are integrated into the existing prior maps, ensuring that they always remain up-to-date with the most current features of the scene. This is particularly important if the system is meant to be run for a long period of time, where atmospheric and lighting conditions are likely to change over the course of the sequence. While there is no specified training period and the system can begin to generate surprise maps immediately after the system begins to process frames, it is generally a good idea to allow the prior map to stabilize before seriously considering the results.

Optionally, this system could employ different time scales for the weighting. As a non-limiting example, one set of weights could use a time constant, t, that is larger, and hence the weights decay more slowly, placing increased emphasis on older values, while a set of weights corresponding to a shorter time scale could be employed to emphasize more recent events. If this method is employed, then the prior map would be equal to some normalized combination of the maps from these two time scales.

Once the system has generated a relatively stable prior map, one can generate the surprise map. The first step is to compute the rectified difference between each feature map for the newest frame (at time t+1) and its corresponding prior map according to the following:

$$SFM_{ij}(t+1) = |P_{ij}(t) - F_{ij}(t+1)|$$

The resulting map provides a spatial map for each feature that shows how much the current scene deviates from the norm for that feature. These are known as surprise feature maps (SFMs) 404, and are analogous to the feature maps in the generic saliency algorithm. The surprise feature maps that correspond to a given feature type are added and normalized to create surprise conspicuity maps (SCMs) 406. More specifically, a surprise color conspicuity map ($SCM_C$) is generated by combining and normalizing the RG and BY surprise feature maps. An intensity surprise conspicuity map ($SCM_I$) is generated by normalizing the LD surprise feature map, while a motion surprise conspicuity map ($SCM_M$) is generated by combining and normalizing the five surprise feature maps for motion.

Finally, the SCMs are added together and normalized to create a surprise map, which consists of a plurality of values that correspond to how far each region in the current frame deviates from what is expected (i.e., the "surprise"). Since the dimensions of the surprise map are directly proportional to the input frame, each value in the surprise map (which range from zero to one after normalization) directly corresponds to a specific region of the camera frame. Thus, a surprise can be identified in the scene based on a value in the surprise map exceeding a predetermined threshold.

After surprise is computed for the frame, the feature maps are integrated into the appropriate prior maps, so that they are updated with the most recent information.

A method of top-down biasing of the surprise algorithm might be obtained by applying weights to each of the surprise feature maps and surprise conspicuity maps during their addition. For example, each of the '+' blocks in FIG. 4 would represent a weighted addition, rather than a simple addition. The top-down biasing can be combined with a user feedback loop, in which the user indicates which regions returned by the surprise algorithm contain a target, versus those that are false alarms. For example, for each false alarm indicated by the user, the system could look at the surprise feature map values that contributed to the erroneous surprise score and decrease the weight of the surprise feature maps that contributed most strongly to the surprise score (how to adjust the weights is arbitrary). In this way, the system is unlikely to return the same region of interest for the same reason as it originally did. However, since the inhibition is specialized to a fixed subset of channels, this provides the advantage that if an event actually occurs in that region of the scene, the surprise system will not be blind to it due to the inhibition.

Note that while this method gives some top-down biasing benefits; it is somewhat ad-hoc and cannot be applied quickly enough to learn a top-down biasing for novel imagery. It will also never match a human performance or strategies that a human employs during search.

Figure 6:
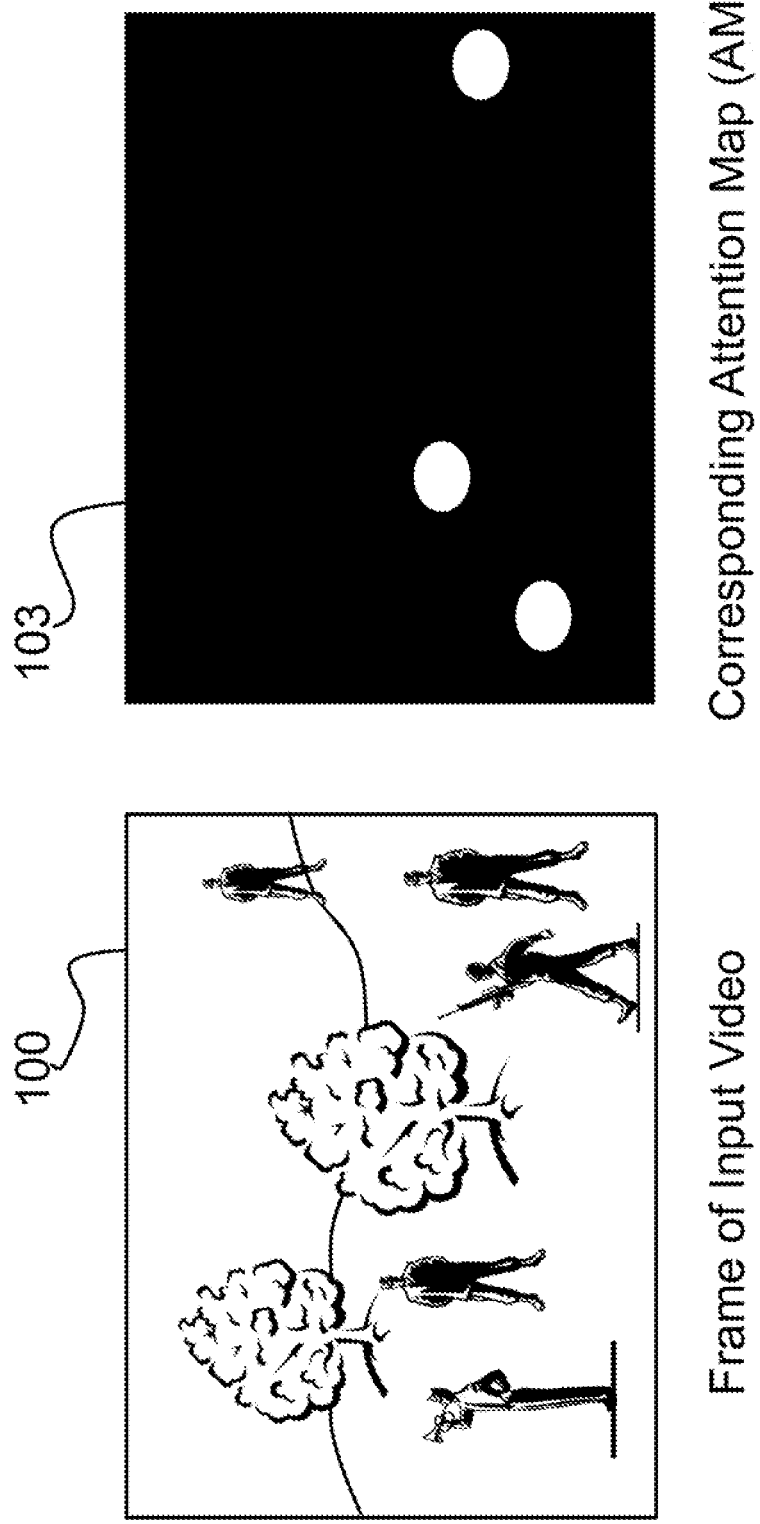
FIG. 6 is an illustration depicting an example of an input image and a corresponding Attention Map (AM)

Note that the video was processed through the AM module 102 a priori with the resulting AM 103 stored. For example, FIG. 6 illustrates a frame of an input video 100 and the corresponding AM 103. Note that in other embodiments, the video can be processed on the fly by starting processing a few frames before showing the video to the user. This allows the next step of masking to be completed on that frame before presenting it to the user as shown in FIG. 3A.

(4.4) Eye-Fixation Map

The eye-fixation map uses an eye tracking device to collect data regarding each subject's fixations on the input image, with the idea that if a subject's eye fixates on a particular feature in the input image, that feature is a potential object-of-interest. In the case of the Masked Map (and Masked BESA), the subject is presented the masked video, whereas in Basic BESA, the subject is presented with the original input video.

The eye tracking device is any suitable mechanism, device, or procedure that allows for tracking a subject's eye fixations. As a non-limiting example, the eye movements of subjects are tracked using an ASL EYE-TRAC®6, a desk mounted eye-tracking device produced by Applied Sciences Laboratory, located at 175 Middlesex Turnpike, Bedford, Mass. 01730 USA. In this non-limiting example, the eye tracking device accurately measures each subject's point of gaze on a stationary screen. The device uses an infrared light emitting diode to illuminate the subject's cornea for robust pupil discrimination. The device contains a tracking mirror assembly to follow the motion of the subject's eye/head. To facilitate the eye tracking device, each subject is directed to place their head in a head rest to keep their head stationary and the position of their eye constant. The head rest is placed so that the subject's eye is 24 inches from the eye-tracking device to optimize tracking ability and so that the subject's eyes are approximately level to the middle of the display. The eye tracking device is placed immediately below and 6 inches in front of the display. The eye tracking device is angled so that the entire display falls within the devices measurable angle of view. In this example, the sampling frequency of the device is 120 Hz.

Although not strictly required, it may be desirable to perform a calibration procedure. In other words, to accurately map the position of the subject's gaze to the position on the display screen, a calibration procedure can be undertaken in which the subject is asked to look at number of points (e.g., nine) on the display. After the calibration, the subject is asked to look at the points again to test the accuracy of the calibration. Such a calibration procedure is desirably performed done before the actual input video is displayed to the subject.

When affixed with the eye tracking device, each user (or subject) is presented with the input video to identify the subjects' eye fixations. As a non-limiting example, each subject is shown a single video clip of 5000 frames at 40 Hz. For example, the video is of a static scene with a number of prospective targets. The ability to identify the targets can vary from moderately difficult to very difficult. In some videos, the targets are recognizable for varying periods of time and are often occluded. More than one target is often recognizable at a time in different portions of the display.

Figure 7:
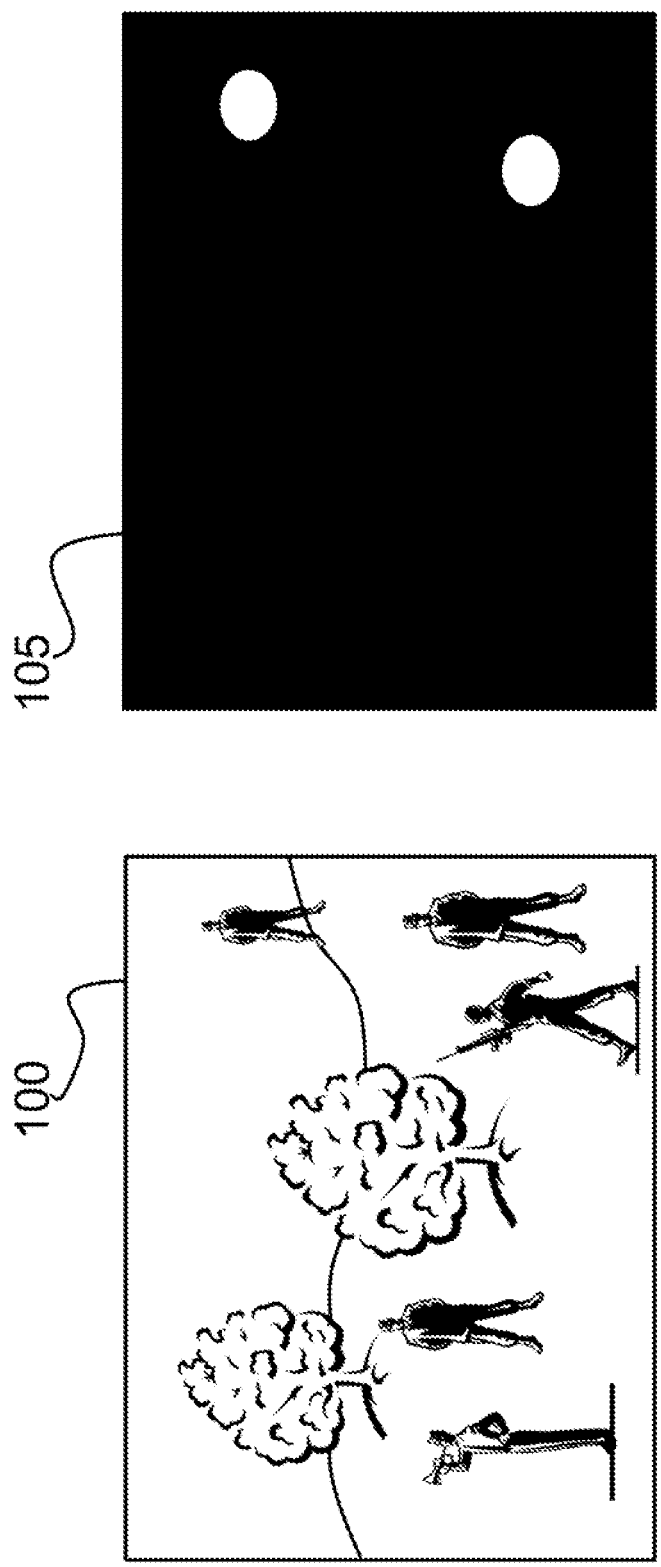
FIG. 7 is an illustration depicting an example of an input image and a corresponding Eye-fixation Map (EM)

To identify each subject's fixations using the collected data from the eye tracking device, a dispersion-threshold identification method is applied (see Literature Reference No. 10). In this case, a fixation is defined as the data points, within a temporal window, that have a certain amount of agreement in their spatial position. The points are processed consecutively. For each new prospective fixation, the centroid (running average) of consecutive points is updated as new points are processed. If the distance from the next point to the centroid is below a threshold, the point is included within the current prospective fixation. Otherwise, the current prospective fixation is ended, and computations for a new prospective fixation are begun. If the prospective fixation lasts for a minimum sized temporal window, it is classified as a fixation and its spatial position (the computed centroid) and temporal position (the frame in which it is present) are recorded. This process contains two parameters, the spatial threshold and the temporal threshold. The temporal threshold is set at a predetermined number of data points. As a non-limiting example, the temporal threshold is set at 20 data points which corresponds to about 167 milliseconds (ms). This is consistent with reports that fixations are minimum 100 ms. The spatial threshold is similarly set at a predetermined spatial value. As a non-limiting example, the spatial threshold is set at 10 pixels, corresponding to the expected size of targets and distractors in an example video. For example, FIG. 7 depicts an example eye-fixation map 105 for one human subject upon viewing the frame of the input video 100. Note that different humans may have different EM.

(4.5) Fusion

The next step is to combine the AM map 103 and EM map 105 to compute a fused map 107 that is referred to as the Brain-Enhanced Synergistic Attention (BESA) map. This is particularly useful since the AM module 102 and EM module 104 often detect different regions of the scene as evident in FIGS. 6 and 7. Because the computational processes between the AM module 102 and EM module 104 algorithms are so different, the score domains of these algorithms are naturally mismatched. Therefore, to properly fuse the scores from each of these algorithms, they must be normalized into the same dynamic range.

The preferred embodiment is to allow a "training period" in which the algorithms are allowed to run normally, but the maximum and minimum scores from each system are recorded and stored, as well as the mean and variance of the scores. To normalize, the scores are simply processed through a normalization function that constrains the score domain to between zero and one. Throughout the training period, the statistics of each of the score populations are constantly updated as new scores come in; at the end of the training period, the maximum and minimum scores encountered are locked. After normalization, both the scores are between zero and one and normalized—hence they can be easily combined.

The next step is the fusion of normalized scores into a single score which is used to identify the objects-of-interest in the image frame. This can be accomplished using a number of suitable methods, several non-limiting examples of which are listed below:

1. In a desired aspect, the top N scores are picked from across the AM and EM normalized scores. These top N scores is the predetermined plurality of "locations of interest". Using this methodology, the final list of target locations may have any mixture of scores from the two different algorithms.
2. In another aspect, the maximum number of targets is predetermined to analyze for a given period of time and take a fixed number of targets from each algorithm. For example, one could take the five highest EM targets and the five highest AM targets for a total often targets. Or the targets could be apportioned unevenly; for example, the first three targets from motion and the first seven targets from surprise, for a total of ten targets.
3. In another aspect, one might also employ another alternative strategy depending on the specific scenario. For example, one might use all available targets provided by EM and then fill out the remaining available vacancies on the list with targets from AM.
4. In addition to the fusion strategies outlined above, one can also employ more advanced methods of fusion between the EM and AM algorithms that take into account the spatial location of targets returned between the two algorithms and looks for common locations. Regions within the scene that are returned by both the AM module and EM module are assigned higher priority than targets that are either found by one module or the other. Since it is unlikely that the individual modules will return the exact same spatial locations in the scene (unless a target is extremely obvious), a simple processing for field effects may be used (e.g., if the individual modules return points within N pixels of one another in Euclidean distance, then they are considered to be from the same target). For example, the Euclidean distance between each location from the AM and each location from the EM can be computed. For all pairs whose distance is below a threshold (e.g., 20 pixels), the mean of that pair of locations is computed with those locations being assigned a maximum score of 1. These locations will always be picked in the fusion. Once all such locations have been fixed, the remaining locations can be processed according to Methods 1, 2, or 3 as listed above.

(4.6) Mask Map

The Mask Map (MM) module 300 generates a masked map 301 by masking out regions of the image frame that have been previously identified as potential OI in the AM map 103. The MM module 300 uses any suitable method or technique for masking out the relevant regions from the image frame. As a non-limiting example, the masked map 301 is computed from the AM map 103 by picking the top N score chips. These chips then correspond to the mask regions in the image. FIG. 3A depicts an example of a masked map 301 where the greyed out rectangles are the masked regions.

(4.7) Combining the Masked Map and Video to Create the Masked Video

The masked map 301 is combined 302 with the input video 100 to create a masked video, an example frame of which is depicted as element 304. The masked map 301 is combined 302 with the input video 100 using any suitable method or technique, two non-limiting examples of which include No Temporal Filtering (NTF) and with Temporal Filtering. Each of these processes is described in further detail below.

(4.7.1) No Temporal Filter (NTF)

For the NTF process, the system uses each frame's masked map 301 and applies it to the corresponding video frame. This is done on a frame-to-frame basis independently and there is no temporal continuity or processing across frames. In the first embodiment of NTF, called NTF Black (or NTFB), the mask regions are blacked out, i.e., the mask areas are filled with black color to reduce their attention to human eyes, while the unmasked regions retain the original pixel value in the video. In the second embodiment of NTF, called NTF bLurred (or NTFL), the video regions behind the mask regions are blurred. The blurring is achieved by convolving the video region with a Gaussian smoothing kernel, such as:

$$G(x, y) = \frac{1}{2\pi\sigma^2} e^{-\frac{x^2+y^2}{2\sigma^2}},$$

where (x, y) denotes the spatial location of a pixel and $\sigma^2$ is the variance of Gaussian kernel. Larger variance will increase the effect of blurring. In addition, the kernel size for the Gaussian smoothing filter was chosen as 35×35 pixels in the present embodiment of NTFL. Although it should be understood that other pixels values can also be employed according to the principles of the present invention.

(4.7.2) With Temporal Filtering (TF)

In the TF scheme, temporal filtering is used to decide which regions of the video should be masked based on the masked map 301. This can be done in two embodiments:

1. If a specific chip appears in the masked map 301 in M out of N frames, it is treated as a mask region for all of the N frames. M and N can be any suitable number. As a non-limiting example, M and N are typically 6 and 10, respectively. This logic is applied in a sliding window pattern over the entire video (i.e., blocks of N frames). These regions are then blurred similar to NTFL above using a fixed kernel size (such as 31×31 pixels). For example, the system can determine if a potential OI in the masked map is in M out of N frames, where both M and N are greater than one, and if so, then designating a region associated with the potential OI region (e.g., a specific chip) as a masked region for all of the N frames.
2. After determining mask regions by above method, the NTFL blurring is performed using Gaussian kernels of different sizes, mimicking fade-in and fade-out effects. Near the start and end of a masked sliding window, a size-changing Gaussian kernel is used for smoothing the video. The kernel size increases (e.g., 11*11→21*21→31*31) towards the middle of the window to mimic a fade-in effect. Similarly the kernel size decreases (e.g., 31*31→21*21→11*11) from the middle frames toward the end to mimic a fade-out effect. A fixed kernel size (31*31) is used for other middle frames within the sliding window since masked maps consistently exist in these frames. This processing specifically minimizes sudden appearance and disappearance of blurred regions in the video and is less startling to the eye.

(4.8) Example System Components

Figure 8:
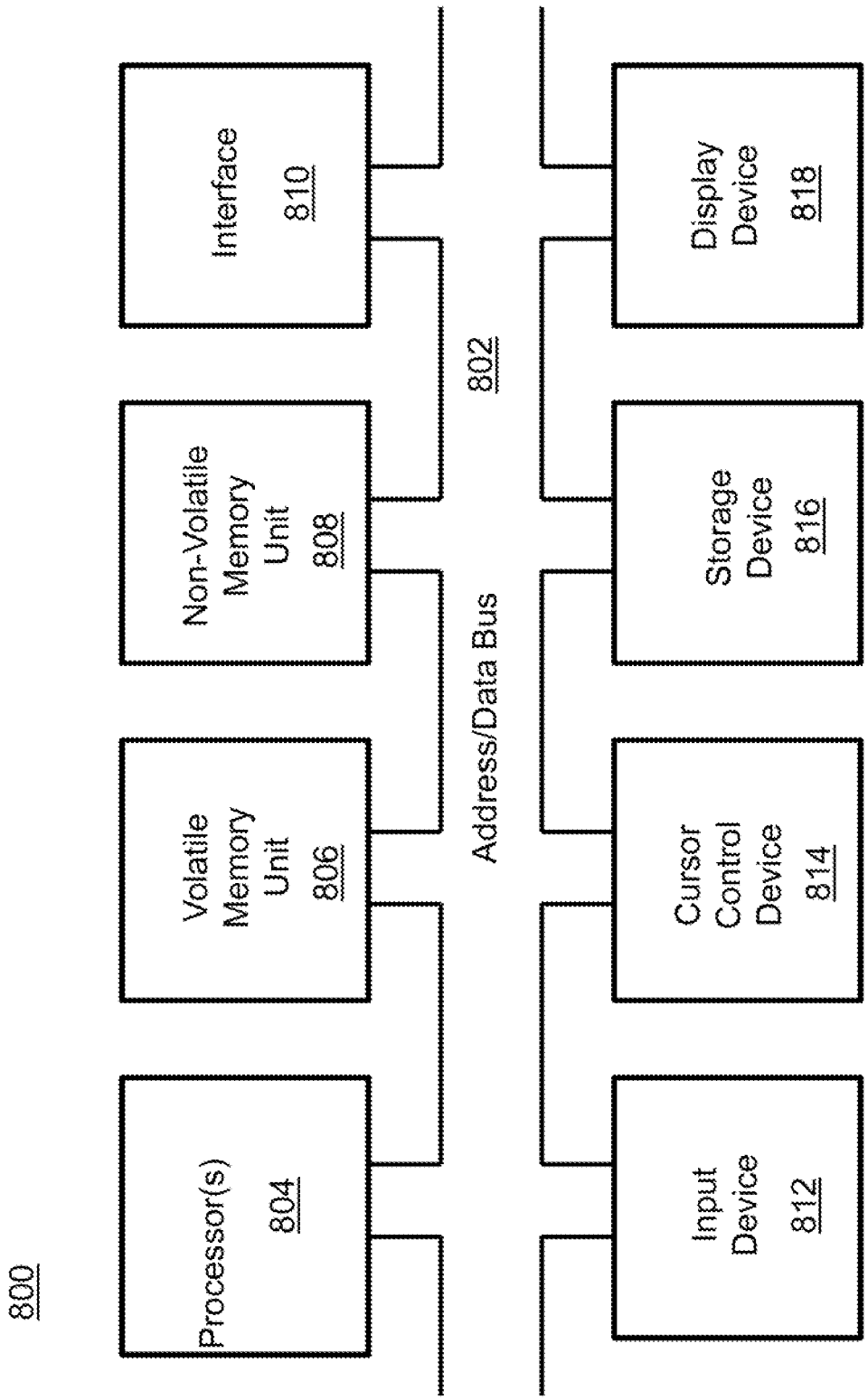
FIG. 8 is a block diagram depicting the components of a system according to the principles of the present invention.

A block diagram depicting an example of a system (i.e., computer system 800) of the present invention is provided in FIG. 8. The computer system 800 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 800. When executed, the instructions cause the computer system 800 to perform specific actions and exhibit specific behavior, such as described herein.

The computer system 800 may include an address/data bus 802 that is configured to communicate information. Additionally, one or more data processing units, such as a processor 804 (or processors), are coupled with the address/data bus 802. The processor 804 is configured to process information and instructions. In an aspect, the processor 804 is a microprocessor. Alternatively, the processor 804 may be a different type of processor such as a parallel processor, or a field programmable gate array.

The computer system 800 is configured to utilize one or more data storage units. The computer system 800 may include a volatile memory unit 806 (e.g., random access memory ("RAM"), static RAM, dynamic RAM, etc.) coupled with the address/data bus 802, wherein a volatile memory unit 806 is configured to store information and instructions for the processor 804. The computer system 800 further may include a non-volatile memory unit 808 (e.g., read-only memory ("ROM"), programmable ROM ("PROM"), erasable programmable ROM ("EPROM"), electrically erasable programmable ROM "EEPROM"), flash memory, etc.) coupled with the address/data bus 802, wherein the non-volatile memory unit 808 is configured to store static information and instructions for the processor 804. Alternatively, the computer system 800 may execute instructions retrieved from an online data storage unit such as in "Cloud" computing. In an aspect, the computer system 800 also may include one or more interfaces, such as an interface 880, coupled with the address/data bus 802. The one or more interfaces are configured to enable the computer system 800 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 800 may include an input device 812 coupled with the address/data bus 802, wherein the input device 812 is configured to communicate information and command selections to the processor 800. In accordance with one aspect, the input device 812 is an alphanumeric input device, such as a keyboard, that may include alphanumeric and/or function keys. Alternatively, the input device 812 may be an input device other than an alphanumeric input device. In an aspect, the computer system 800 may include a cursor control device 814 coupled with the address/data bus 802, wherein the cursor control device 814 is configured to communicate user input information and/or command selections to the processor 800. In an aspect, the cursor control device 814 is implemented using a device such as a mouse, a track-ball, a track-pad, an optical tracking device, or a touch screen. The foregoing notwithstanding, in an aspect, the cursor control device 814 is directed and/or activated via input from the input device 812, such as in response to the use of special keys and key sequence commands associated with the input device 812. In an alternative aspect, the cursor control device 814 is configured to be directed or guided by voice commands.

In an aspect, the computer system 800 further may include one or more optional computer usable data storage devices, such as a storage device 816, coupled with the address/data bus 802. The storage device 816 is configured to store information and/or computer executable instructions. In one aspect, the storage device 816 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 818 is coupled with the address/data bus 802, wherein the display device 818 is configured to display video and/or graphics. In an aspect, the display device 818 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 800 presented herein is an example computing environment in accordance with an aspect. However, the non-limiting example of the computer system 800 is not strictly limited to being a computer system. For example, an aspect provides that the computer system 800 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 9:
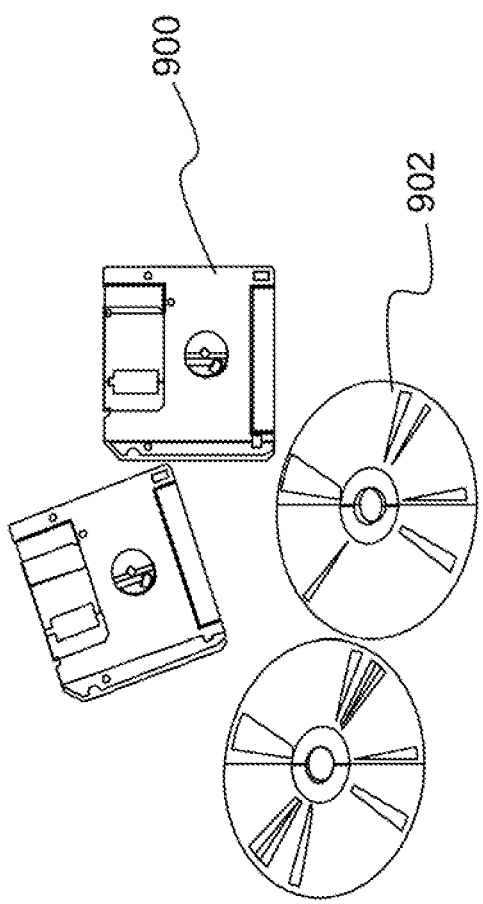
FIG. 9 is an illustration of a computer program product embodying the present invention.

An illustrative diagram of a computer program product (i.e., storage device) embodying the present invention is depicted in FIG. 9. The computer program product is depicted as floppy disk 900 or an optical disk 902 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" may be stored in the memory of a computer or on a computer-readable medium such as a floppy disk, a CD-ROM, and a flash drive. In either event, the instructions are encoded on a non-transitory computer-readable medium.

What is claimed is:

1. A system for detecting objects of interest in imagery, the system comprising:
one or more processors and a memory, the memory having instructions encoded thereon, such that upon execution of the instructions, the one or more processors perform operations of:
receiving an input video;
generating an attention map, the attention map representing features found in the input video that represent potential objects-of-interest;
generating, in real-time, an eye-fixation map, the eye-fixation map representing features found in the input video that, based on a subject's eye fixations in real-time, are potential objects-of-interest;
generating a brain-enhanced synergistic attention map by fusing the attention map with the eye-fixation map, the brain-enhanced synergistic map having a collection of potential objects-of-interest from both the attention map and eye-fixation map;
scoring the potential objects-of-interest in the brain-enhanced synergistic attention map; and
designating the potential objects-of-interest as final objects-of-interest for scores that cross a predetermined threshold.

2. The system as set forth in claim 1, wherein the memory further includes instructions for causing the one or more processors to perform operations of:
generating a masked map that masks the potential objects-of-interest in the attention map;
combining the masked map with the input video to generate a masked video having unmasked regions and masked regions, where the masked regions mask the potential objects-of-interest as generated by the attention map;
presenting the masked video to a subject;
collecting data regarding the subject's eye fixations on the masked video; and
generating the eye-fixation map based on the subject's eye fixations.

3. The system as set forth in claim 2, wherein in collecting data regarding the subject's eye fixations on the masked video, a fixation includes the data points, within a temporal window, having an agreement in spatial position that exceeds a threshold.

4. The system as set forth in claim 3, wherein generating an attention map further comprises operations of:
receiving a series of consecutive frames representing a scene as provided for in the input video, the frames having at least a current frame and a previous frame;
generating a surprise map based on features found in the current frame and the previous frame, the surprise map having a plurality of values corresponding to spatial locations within the scene; and
determining a surprise in the scene based on a value in the surprise map exceeding a predetermined threshold, the surprise being a potential object-of-interest in the attention map.

5. The system as set forth in claim 4, wherein combining the masked map with the input video to generate a masked video further comprises an operation of masking each frame independently of each other frame such that there is no temporal continuity of the masking across frames.

6. The system as set forth in claim 5, wherein masking each frame independently further comprises an operation of blacking out the masked regions while maintaining original pixel values in the unmasked regions.

7. The system as set forth in claim 5, wherein masking each frame independently further comprises an operation blurring the masked region by convolving the masked region with a Gaussian smoothing kernel.

8. The system as set forth in claim 4, wherein combining the masked map with the input video to generate a masked video further comprises operations of:
determining if a potential object-of-interest in the masked map is in M out of N frames, where both M and N are greater than one, and if so, then designating a region associated with the potential object-of-interest as a masked region for all of the N frames; and
blurring the masked region by convolving the masked region with Gaussian smoothing kernels of different sizes.

9. A computer implemented method for detecting objects of interest in imagery, the method comprising an act of:
causing one or more processors to execute instructions encoded upon a memory, that upon execution of the instructions, the one or more processors perform operations of:
receiving an input video;
generating an attention map, the attention map representing features found in the input video that represent potential objects-of-interest;
generating, in real-time, an eye-fixation map, the eye-fixation map representing features found in the input video that, based on a subject's eye fixations in real-time, are potential objects-of-interest;
generating a brain-enhanced synergistic attention map by fusing the attention map with the eye-fixation map, the brain-enhanced synergistic map having a collection of potential objects-of-interest from both the attention map and eye-fixation map;
scoring the potential objects-of-interest in the brain-enhanced synergistic attention map; and
designating the potential objects-of-interest as final objects-of-interest for scores that cross a predetermined threshold.

10. The computer implemented method as set forth in claim 9, further comprising an act of causing the one or more processors to perform operations of:
generating a masked map that masks the potential objects-of-interest in the attention map;
combining the masked map with the input video to generate a masked video having unmasked regions and masked regions, where the masked regions mask the potential objects-of-interest as generated by the attention map;
presenting the masked video to a subject;
collecting data regarding the subject's eye fixations on the masked video; and
generating the eye-fixation map based on the subject's eye fixations.

11. The computer implemented method as set forth in claim 10, wherein in collecting data regarding the subject's eye fixations on the masked video, a fixation includes the data points, within a temporal window, having an agreement in spatial position that exceeds a threshold.

12. The computer implemented method as set forth in claim 11, wherein generating an attention map further comprises operations of:
  receiving a series of consecutive frames representing a scene as provided for in the input video, the frames having at least a current frame and a previous frame;
  generating a surprise map based on features found in the current frame and the previous frame, the surprise map having a plurality of values corresponding to spatial locations within the scene; and
  determining a surprise in the scene based on a value in the surprise map exceeding a predetermined threshold, the surprise being a potential object-of-interest in the attention map.

13. The computer implemented method as set forth in claim 12, wherein combining the masked map with the input video to generate a masked video further comprises an operation of masking each frame independently of each other frame such that there is no temporal continuity of the masking across frames.

14. The computer implemented method as set forth in claim 13, wherein masking each frame independently further comprises an operation of blacking out the masked regions while maintaining original pixel values in the unmasked regions.

15. The computer implemented method as set forth in claim 13, wherein masking each frame independently further comprises an operation blurring the masked region by convolving the masked region with a Gaussian smoothing kernel.

16. The computer implemented method as set forth in claim 12, wherein combining the masked map with the input video to generate a masked video further comprises operations of:
  determining if a potential object-of-interest in the masked map is in M out of N frames, where both M and N are greater than one, and if so, then designating a region associated with the potential object-of-interest as a masked region for all of the N frames; and
  blurring the masked region by convolving the masked region with Gaussian smoothing kernels of different sizes.

17. A computer program product for detecting objects of interest in imagery, the computer program product comprising computer-readable instructions stored on a non-transitory computer-readable medium that are executable by a computer having one or more processors for causing the one or more processors to perform operations of:
  receiving an input video;
  generating an attention map, the attention map representing features found in the input video that represent potential objects-of-interest;
  generating, in real-time, an eye-fixation map, the eye-fixation map representing features found in the input video that, based on a subject's eye fixations in real-time, are potential objects-of-interest;
  generating a brain-enhanced synergistic attention map by fusing the attention map with the eye-fixation map, the brain-enhanced synergistic map having a collection of potential objects-of-interest from both the attention map and eye-fixation map;
  scoring the potential objects-of-interest in the brain-enhanced synergistic attention map; and
  designating the potential objects-of-interest as final objects-of-interest for scores that cross a predetermined threshold.

18. The computer program product as set forth in claim 17, further comprising instructions causing the one or more processors to perform operations of:
  generating a masked map that masks the potential objects-of-interest in the attention map;
  combining the masked map with the input video to generate a masked video having unmasked regions and masked regions, where the masked regions mask the potential objects-of-interest as generated by the attention map;
  presenting the masked video to a subject;
  collecting data regarding the subject's eye fixations on the masked video; and
  generating the eye-fixation map based on the subject's eye fixations.

19. The computer program product as set forth in claim 18, wherein in collecting data regarding the subject's eye fixations on the masked video, a fixation includes the data points, within a temporal window, having an agreement in spatial position that exceeds a threshold.

20. The computer program product as set forth in claim 19, wherein generating an attention map further comprises operations of:
  receiving a series of consecutive frames representing a scene as provided for in the input video, the frames having at least a current frame and a previous frame;
  generating a surprise map based on features found in the current frame and the previous frame, the surprise map having a plurality of values corresponding to spatial locations within the scene; and
  determining a surprise in the scene based on a value in the surprise map exceeding a predetermined threshold, the surprise being a potential object-of-interest in the attention map.

21. The computer program product as set forth in claim 20, wherein combining the masked map with the input video to generate a masked video further comprises an operation of masking each frame independently of each other frame such that there is no temporal continuity of the masking across frames.

22. The computer program product as set forth in claim 21, wherein masking each frame independently further comprises an operation of blacking out the masked regions while maintaining original pixel values in the unmasked regions.

23. The computer program product as set forth in claim 21, wherein masking each frame independently further comprises an operation blurring the masked region by convolving the masked region with a Gaussian smoothing kernel.

24. The computer program product as set forth in claim 20, wherein combining the masked map with the input video to generate a masked video further comprises operations of:
  determining if a potential object-of-interest in the masked map is in M out of N frames, where both M and N are greater than one, and if so, then designating a region associated with the potential object-of-interest as a masked region for all of the N frames; and
  blurring the masked region by convolving the masked region with Gaussian smoothing kernels of different sizes.

\* \* \* \* \*